(12) United States Patent
Friedl et al.

(10) Patent No.: US 12,119,732 B2
(45) Date of Patent: Oct. 15, 2024

(54) ELECTRIC MACHINE AND WIND TURBINE

(71) Applicant: Flender GmbH, Bocholt (DE)

(72) Inventors: Daniel Friedl, Fürstenzell (DE);
Thomas Garhammer, Buechiberg (DE); Robert Gruber, Ruhstorf an der Rott (DE); Mesaros Akos Keceli, Senta (RS); Oliver Memminger, Neuburg am Inn (DE); Günther Ortmeier, Ruhstorf an der Rott (DE); Klaus Schifferer, Neuhaus am Inn (DE); Laslo Toldi, Subotica (RS); Anatoli Vogel, Passau (DE)

(73) Assignee: Flender GmbH, Bocholt (DE)

( * ) Notice: Subject to any disclaimer, the term of this patent is extended or adjusted under 35 U.S.C. 154(b) by 0 days.

(21) Appl. No.: 18/029,845

(22) PCT Filed: Nov. 2, 2021

(86) PCT No.: PCT/EP2021/080309
§ 371 (c)(1),
(2) Date: Mar. 31, 2023

(87) PCT Pub. No.: WO2022/101054
PCT Pub. Date: May 19, 2022

(65) Prior Publication Data
US 2023/0369941 A1     Nov. 16, 2023

(30) Foreign Application Priority Data

Nov. 12, 2020 (EP) .................................. 20207079

(51) Int. Cl.
*H02K 7/18* (2006.01)
*H02K 1/18* (2006.01)

(52) U.S. Cl.
CPC ............ *H02K 7/183* (2013.01); *H02K 1/185* (2013.01); *H02K 2213/03* (2013.01)

(58) Field of Classification Search
CPC .... H02K 7/183; H02K 1/185; H02K 2213/03; H02K 5/24; Y02E 10/72
See application file for complete search history.

(56) References Cited

U.S. PATENT DOCUMENTS

| | | | |
|---|---|---|---|
| 5,331,238 A * | 7/1994 | Johnsen | H02K 5/203 |
| | | | 310/58 |
| 5,783,892 A * | 7/1998 | Kanzaki | H02K 5/04 |
| | | | 310/58 |

(Continued)

FOREIGN PATENT DOCUMENTS

| | | |
|---|---|---|
| EP | 0 367 044 A1 | 5/1990 |
| EP | 2 256 904 A1 | 12/2010 |

(Continued)

OTHER PUBLICATIONS

International Search Report issued on Jan. 12, 2022 by the European Patent Office in International Application PCT/EP2021/080309.

*Primary Examiner* — Pedro J Cuevas
(74) *Attorney, Agent, or Firm* — Henry M. Feiereisen LLC

(57) ABSTRACT

An electric machine includes a hollow-cylindrical stator and at least two receiving elements, each receiving element at least partially enclosing the stator in a circumferential direction along an inner coverage length and conjointly connected to the stator in the circumferential direction along an inner fastening length. A stator housing is conjointly connected to the receiving elements in the circumferential direction along the outer fastening length. The inner fastening length extends at most along 120° in the circumferential (Continued)

direction, and the outer fastening length extends at most along 200° in the circumferential direction.

20 Claims, 13 Drawing Sheets

(56) References Cited

U.S. PATENT DOCUMENTS

| | | | | |
|---|---|---|---|---|
| 11,817,743 | B2* | 11/2023 | Holopainen | ............. H02K 5/00 |
| 2014/0284932 | A1* | 9/2014 | Sharkh | .................... F03D 13/20 |
| | | | | 290/54 |
| 2020/0195084 | A1* | 6/2020 | Lin | ........................ B60K 11/02 |
| 2020/0343778 | A1 | 10/2020 | Roivainen et al. | |
| 2021/0351640 | A1* | 11/2021 | Holopainen | ........... H02K 7/083 |
| 2023/0107792 | A1* | 4/2023 | Desai | .................... H02K 1/146 |
| | | | | 310/51 |
| 2024/0162794 | A1* | 5/2024 | Binder | .................. H02K 17/42 |

FOREIGN PATENT DOCUMENTS

| | | | | |
|---|---|---|---|---|
| EP | 4002647 A1 * | 5/2022 | ............ | H02K 1/185 |
| EP | 4040650 A1 * | 8/2022 | ............ | H02K 1/185 |
| WO | WO-2022101054 A1 * | 5/2022 | ............ | H02K 1/185 |

\* cited by examiner

ELECTRIC MACHINE AND WIND TURBINE

CROSS-REFERENCES TO RELATED APPLICATIONS

This application is the U.S. National Stage of International Application No. PCT/EP2021/080309, filed Nov. 2, 2021, which designated the United States and has been published as International Publication No. WO 2022/101054 A1 and which claims the priority of European Patent Application, Serial No. 20207079.1, filed Nov. 12, 2020, pursuant to 35 U.S.C. 119(a)-(d).

BACKGROUND OF THE INVENTION

The invention relates to an electric machine, in particular an electrical generator for a wind turbine, having a hollow-cylindrical stator, at least two receptacle elements, wherein the respective receptacle element at least partially encloses the stator in the circumferential direction along a respective inner cover length, and wherein the respective receptacle element in the circumferential direction along a respective inner fastening length is non-rotatably connected to the stator, and a stator housing, wherein the stator housing at least partially encloses the respective receptacle element in the circumferential direction along a respective outer covering length, and wherein the stator housing is connected in a rotationally fixed manner to the respective receptacle element in the circumferential direction along a respective outer fastening length, and wherein the respective inner fastening length extends at most along half of the respective inner cover length and/or the respective outer fastening length extends at most along two-thirds of the respective outer cover length. In particular, the invention relates to a dynamo-electric machine designed in this manner.

Furthermore, the invention relates to a wind turbine having an electric machine of this type.

An electric machine of this type, or a wind turbine of this type, is used, for example, to convert the energy of wind into electrical energy, in order to then feed this energy into a power grid. Such electric machines have a rotor which is rotatably mounted in the stator.

The generators and their components are becoming more and more compact as a result of cost and installation space optimization and increasing performance requirements of wind turbines. This means that the stator housing has a lower weight and is exposed to higher operating loads while the size remains the same and the output increases.

The vibrations and operating loads generated by the stator core, which are caused by magnetic pull, are introduced into the housing. This in turn increases the vibration behavior so that the operating noise of the generators increases and exceeds the maximum values specified by the customer.

Known from EP 367 044 A1 is a horizontal-axis electric machine in which an elastic suspension of the laminated stator core is achieved by supporting the laminated stator core on the housing only at the top and bottom and by supporting the housing on the foundation only on the left and right.

A support structure for a rotating electric machine is known from EP 2 256 904 A1, in which a stator is held by pressure on a semi-circular carcass.

An electric machine, in particular an electric generator for a wind turbine, is known from US 2020/034 3778 A1, having a hollow-cylindrical stator, at least two receptacle elements, wherein the respective receptacle element at least partially encloses the stator in the circumferential direction along a respective inner cover length, and wherein the respective receptacle element is connected in a rotationally fixed manner to the stator in the circumferential direction along a respective inner fastening length, and a stator housing, wherein the stator housing at least partially encloses the respective receptacle element in the circumferential direction along a respective outer cover length, and wherein the stator housing is connected in a rotationally fixed manner in the circumferential direction along a respective outer fastening length to the respective receptacle element, and wherein the respective inner fastening length extends at most along half of the respective inner cover length and/or the respective outer fastening length extends at most along two-thirds of the respective outer cover length. This device forms the preamble of claim 1.

The object of the invention is to provide an electric machine or a wind turbine which, in particular, overcomes the disadvantages mentioned and improves the sound insulation compared to the prior art.

SUMMARY OF THE INVENTION

A solution to the problem is provided by an electric machine of the type mentioned at the outset in that the respective inner fastening length extends along at most 1200, in particular along 50° to 80°, in the circumferential direction, and the respective outer fastening length extends along at most 200°, in particular along 60° to 200° or 80° to 120°, in the circumferential direction.

A second, parallel or additive solution to the problem results from an electric machine of the type mentioned at the outset in that the respective inner fastening length in the circumferential direction is divided into a plurality of inner fastening portions mutually spaced apart, preferably into at least three or at most six inner fastening portions, and the respective outer fastening length in the circumferential direction is divided into a plurality of outer fastening portions mutually spaced apart, preferably into at least two and at most six outer fastening portions.

As can easily be seen, the first and the second solution to the problem are not different technical ideas, but just different descriptions of the same technical solution of the invention.

Furthermore, the object is achieved by a wind turbine of the type mentioned at the outset in that the wind turbine has the proposed electric machine.

The proposed electric machine from radially inside to radially outside thus has the hollow-cylindrical stator, then the respective receptacle element and finally the stator housing. The stator, the respective receptacle element and the stator housing are each connected to one another in a rotationally fixed manner. Usually, the rotatably mounted rotor of the electric machine is disposed within the stator, the former, however, not being considered relevant to the essence of the invention.

The respective receptacle element can completely enclose the stator in the circumferential direction, so that the length of the inner cover extends across the full circumference of 360°. It is also possible that the respective receptacle element only partially encloses the stator, for example by three quarters or two thirds, so that the inner cover length extends across 270° or 240° accordingly. The respective receptacle element and the stator are connected to one another along a respective inner fastening length.

The stator housing can in turn completely enclose the respective receptacle element in the circumferential direction, so that the outer cover length extends across the full circumference of 360°. Here, too, it is possible for the stator housing to only partially enclose the respective receptacle element, for example to the extent of two-thirds or half, so that the outer cover length correspondingly extends across 240° or 180°. The stator housing and the respective receptacle element are connected to each other along a respective outer fastening length.

The receptacle elements are disposed so as to be mutually offset in the axial direction. The stator housing can, in particular, be designed in several parts, wherein the respective outer covering length and the respective outer fastening length relate in particular to the assembled, multi-part stator housing.

The proposed electric machine can be designed according to two variants, which can also be combined with one another. According to the first variant, the respective inner fastening length is at most half the length of the respective inner cover length. If the inner cover length extends across the full circumference of 360°, then according to this first variant it is provided that the inner fastening length extends at most across half the circumference, i.e. 180°. This means that the respective receptacle element and the stator are connected to one another at most in the circumferential direction along 180° and are not connected to one another in the circumferential direction at least across 180°.

The following comparison with a rim of an automobile is to be permitted only for improved visualization. The inside of the rim would correspond to the stator and the outside of the rim to the respective receptacle element. The inside and the outside of the rim are usually connected to one another by means of a plurality of spokes, it being possible for the spokes to be of a wider or narrower design in the circumferential direction. The inner coverage length of 360° in this analogy means that the outside of the rim completely encloses the inside. The inner fastening length of at most 180° means that the coverage of the spokes together make up at most half the circumference, so that recesses between the spokes are disposed across at least half the circumference— again cumulative in the circumferential direction.

If the inner cover length is selected to be smaller, for example three quarters of the full circumference or 270°, then a correspondingly smaller portion remains for the inner fastening length in the circumferential direction, here e.g. at most 135°.

According to the second variant, the respective outer fastening length is at most as large as two thirds of the respective outer cover length. If the outer cover length extends across the full circumference of 360°, then according to this second variant it is provided that the outer fastening length extends across at most two thirds of the circumference, i.e. 240°. This means that the stator housing and the respective receptacle element are connected to one another at most in the circumferential direction along 240° and are not connected to one another in the circumferential direction at least over 120°.

If the outer cover length is selected to be smaller, for example three quarters of the full circumference or 270°, then a correspondingly smaller section remains for the outer fastening length in the circumferential direction, here e.g. at most 90°.

Particularly good results can be achieved if the two variants are combined according to the invention, i.e. that the respective inner fastening length extends at most along half of the respective inner cover length and that at the same time the respective outer fastening length extends at most along two thirds of the respective outer cover length.

In particular, the proposed electric machine is designed as a dynamo-electric machine.

The solution is thus achieved according to the first variant by reducing the contact surfaces from the stator or stator core to the respective receptacle element or core receptacle ring. The stator or stator core is therefore only partially connected to the respective receptacle element or core receptacle ring. Furthermore, the solution according to the second variant succeeds in that the contact surface of the respective receptacle element or of the respective package receptacle to the stator housing is reduced. The respective receptacle element or the respective package receptacle ring is thus connected to the stator housing only in places. As already mentioned, particularly good results can be achieved by reducing the two contact surfaces mentioned.

The proposed electric machine has particularly advantageous vibration properties and can therefore be operated at quieter operating noises. One of the reasons for this is that the stator pulsates and vibrates during operation, generating noise that can be transmitted to the housing and could be hidden in the process. The reduction in the contact surface(s) explained above makes it more difficult for the vibrations of the stator to be transmitted direct to the respective receptacle element and finally to the stator housing, on the one hand. On the other hand, this allows the stator to oscillate more freely in relation to the respective receptacle element, or the respective receptacle element in relation to the stator housing, respectively.

For example, the respective inner fastening length or respective inner fastening portions can be disposed at least predominantly in the region of a respective node of vibration of the stator that is operated and thus oscillates during a predefinable speed. As an alternative or in addition, the respective outer fastening length or respective outer fastening portions can be disposed in the region of a respective antinode of the stator which is operated and thus oscillates during a predefinable speed. The inner and outer fastening portions will be explained in more detail below. Depending on the design of the electric machine, it is also conceivable that the respective inner fastening length or respective inner fastening portions can be at least predominantly in the region of a respective antinode and/or the respective outer fastening length or respective outer fastening portions can be in the region of a respective vibration node of the stator, the latter being operated at a predefinable rotating speed and thus vibrating.

The proposed electric machine has the advantage, for example, that the stator housing can be designed with smaller sheet metal thicknesses as the overall size increases, and that additional stiffening ribs can be dispensed with, at least in part. This reflects a cost advantage. As a result, increasing sizes and outputs can be realized while at the same time complying with the vibration levels and noise levels tolerated by the customer.

In an advantageous embodiment of the invention, the respective receptacle element is designed as a receptacle ring which completely encloses the stator in the circumferential direction. By shaping the respective receptacle element as a receptacle ring, good vibration properties can be achieved, while at the same time a sufficiently high level of mechanical stability is achieved, which is required for the transmission of large torques from the stator to the stator housing.

In a further advantageous embodiment of the invention, the respective receptacle element is mechanically releasably and/or connected in a form-fitting manner to the stator in the circumferential direction along the respective inner fastening length.

The mechanically releasable connection can be achieved, for example, by screwing the respective receptacle element to the stator, with screwed regions extending in the circumferential direction along the respective inner fastening length. For example, a connection of the respective receptacle element to the stator can be achieved or secured, for example, by cylindrical pins. The torque can then be transmitted by the cylinder pins. Alternatively, a shrink fit would also be possible as a positive connection.

In a further advantageous embodiment of the invention, the stator housing is mechanically releasably connected or connected in a materially integral manner, in particular welded, to the respective receptacle element in the circumferential direction along the respective outer fastening length.

Analogously to the advantageous embodiment explained above, the mechanically releasable connection can be achieved by screwing the stator housing to the respective receptacle element, with screwed regions extending in the circumferential direction along the respective outer fastening length. Alternatively, an integral connection of the stator housing to the respective receptacle element can be provided, in particular a weld, which extends in the circumferential direction along the respective outer fastening length.

In the case of the invention, the respective inner fastening length extends at most along 120°, in particular along 50° to 80°, in the circumferential direction.

With a respective inner fastening length of at most 120°, sufficiently large torques can still be reliably transmitted from the stator to the respective receptacle element. In addition, a sufficient reduction in the transmission of stator vibrations to the respective receptacle element and thus a sufficient reduction in operating noise can be achieved at the same time. Particularly good results can be achieved if the respective inner fastening length extends in the circumferential direction along 50° to 80°, for example approximately 70°. The respective receptacle element preferably completely encloses the stator in the circumferential direction.

In the case of the invention, the respective outer fastening length extends at most along 200°, in particular along 60° to 200° or 80° to 120°, in the circumferential direction.

With a respective outer fastening length of at most 200°, sufficiently large torques can in turn be reliably transmitted from the respective receptacle element to the stator housing. In addition, a sufficient reduction in the transmission of vibrations from the respective receptacle element to the stator housing and thus a sufficient reduction in operating noise can also be achieved at the same time. Particularly good results can be achieved if the respective outer fastening length extends in the circumferential direction along 60° to 200°, in particular 80° to 120°.

In a further advantageous embodiment of the invention, the respective inner fastening length is divided in the circumferential direction into a plurality of inner fastening portions mutually spaced apart, preferably into at least three and at most six inner fastening portions.

The respective inner fastening length can thus be subdivided into several individual inner fastening portions, which are distributed about the stator in the circumferential direction and do not touch one another. For example, the inner fastening portions can be disposed about a center of gravity that either coincides with the longitudinal axis of the stator or is quite close to it—compared to the outer diameter of the stator. Since the electric machine is preferably operated with a horizontally aligned longitudinal axis and the stator may be several tons under certain circumstances, this center of gravity can also be disposed below the longitudinal axis of the stator. The subdivision of the respective inner fastening length into several inner fastening portions facilitates the transmission of large torques and also contributes to transmitting comparatively few vibrations from the stator to the respective receptacle element and thus reducing the operating noise of the electric machine.

The individual inner fastening portions can extend in the circumferential direction, for example, between 10° and 50°, in particular between 20° and 40°.

Particularly good results can be achieved if at least three and/or at most six inner fastening portions are provided.

In the comparison to an automobile rim discussed above, the inner fastening portions would correspond to individual spokes of the rim.

In the other description of the invention, the respective outer fastening length is divided in the circumferential direction into a plurality of outer fastening portions mutually spaced apart, preferably into at least two and at most six outer fastening portions.

The respective outer fastening length can thus be subdivided into several individual outer fastening portions, which are distributed about the respective receptacle element in the circumferential direction and do not touch one another. For example, the outer fastening portions can be disposed about a center of gravity that either coincides with the longitudinal axis of the stator or is quite close to it—compared to the outer diameter of the stator. Since the electric machine is preferably operated with a horizontally aligned longitudinal axis and the stator may be several tons under certain circumstances, this center of gravity can also be disposed below the longitudinal axis of the stator. The subdivision of the respective outer fastening length into several outer fastening portions facilitates the transmission of large torques and also contributes to transmitting comparatively few vibrations from the respective receptacle element to the stator housing and thus reducing the operating noise of the electric machine.

The individual outer fastening portions can extend in the circumferential direction, for example, between 5° and 200°, in particular between 40° and 80°. For example, a fairly narrow, outer fastening portion may be located at the top in cross-section and extend along only 5° to 20°, with one or two wide, outer fastening portions located at the bottom in cross-section. If such a wide, outer fastening portion is provided below, it can extend along up to 190°. If two such broad, outer fastening portions are provided below, they can each extend along 50-80°, for example approx. 70°, and lie opposite one another in cross-section perpendicular to the longitudinal axis.

Particularly good results can be achieved if at least two and/or at most six inner fastening portions are provided.

In the comparison to a car rim discussed above, the outer fastening portions would correspond to individual spokes of the rim.

In a further advantageous embodiment of the invention, the electric machine has at least as many respective inner fastening portions as respective outer fastening portions, preferably more respective inner fastening portions than respective outer fastening portions.

Good results with regard to the reduction of the vibration transmission from the stator to the stator housing and with regard to noise reduction can be achieved in that at least as many respective inner fastening portions are provided as respective outer fastening portions. Particularly good results can be achieved when the number of the respective inner fastening portions exceeds the number of the respective outer fastening portions.

In a further advantageous embodiment of the invention, at least one of the respective inner fastening portions is disposed so as to be offset in the circumferential direction relative to the respective outer fastening portions, wherein preferably two or more or all of the respective inner fastening portions are disposed so as to be offset in the circumferential direction relative to the respective outer fastening portions.

The offset in the circumferential direction of at least one of the respective inner fastening portions compared to the respective outer fastening portions can ensure that the respective receptacle element can absorb vibrations of the stator particularly well, but does not pass these vibrations on to the stator housing. This works particularly well if two or more or all of the respective inner fastening portions are offset in the circumferential direction with respect to the respective outer fastening portions.

Preferably, the at least one respective inner fastening portion is completely offset in the circumferential direction with respect to the respective outer fastening portions, so that there is no overlap. However, decent results can still be achieved if the at least one respective inner fastening portion is predominantly offset in the circumferential direction with respect to the respective outer fastening portions, i.e. the at least one respective inner fastening portion is offset and overlaps at least half of its extent in the circumferential direction with respect to the respective outer fastening portions thus less than half of its extension in the circumferential direction with the respective outer fastening portion.

In a further advantageous embodiment of the invention, at least one of the respective inner fastening portions overlaps in the circumferential direction with at least one of the respective outer fastening portions, with two or more or all of the respective inner fastening portions preferably overlapping with at least one of the respective outer fastening portions in the circumferential direction.

The overlap in the circumferential direction of the at least one respective inner fastening portion with at least one of the respective outer fastening portions can simplify the transmission of a sufficiently large torque from the stator to the respective receptacle element and finally to the stator housing. Depending on the configuration of the electric machine, it can be advantageous if two or more or all of the respective inner fastening portions overlap with at least one of the respective outer fastening portions in the circumferential direction.

A partial overlap is often sufficient for the transmission of even large torques, in particular if less than half of the extent of the at least one respective inner fastening portion overlaps the respective outer fastening portion in the circumferential direction. However, in some examples, the at least one respective inner fastening portion completely circumferentially overlaps at least one of the respective outer fastening portions.

Preferably, only one to two respective inner fastening portions overlap with at least one of the respective outer fastening portions, with at least one of the respective inner fastening portions not overlapping with one of the respective outer fastening portions.

In a further advantageous embodiment of the invention, an inner air gap is disposed between the respective receptacle element and the stator so as to be outside the respective inner fastening length in the radial direction.

The inner air gap in the circumferential direction is thus disposed in particular between two adjacent respective inner fastening portions. The inner air gap is preferably at least as large as the radial amplitudes of vibrations or deformations of the stator occurring during operation of the stator. Damage can thus be avoided by ensuring that the stator during its operation does not touch the respective receptacle element outside the respective inner fastening length.

In a further advantageous embodiment of the invention, an outer air gap is disposed between the stator housing and the respective receptacle element so as to be outside the respective outer fastening length in the radial direction.

The outer air gap is thus disposed in the circumferential direction in particular between two adjacent respective outer fastening portions. The outer air gap is preferably at least as large as the radial amplitudes of vibrations or deformations of the respective receptacle element occurring during operation of the stator. Damage can thus be avoided by ensuring that the respective receptacle element does not touch the stator housing outside the respective outer fastening length during operation of the stator. In particular, the outer air gap is chosen to be as small as possible so that the circulating cooling air is sealed off as well as possible and thus painting of the outer air gap is still possible. Good results can be obtained with an external air gap of 3 mm to 30 mm, wherein the range of 7 mm to 15 mm is preferred.

In a further advantageous embodiment of the invention, the stator has an outside diameter of at least 900 mm, wherein the electric machine has an electrical output of at least 1.5 MW.

The electric machine preferably has an output of approximately 5 MW. For example, the stator has an outer diameter of approx. 1300 mm. The electric machine can, for example, have a mass of several tons, in particular more than 8 tons.

In a further advantageous embodiment of the invention, the electric machine or the stator housing has at least one support device, for example a foot stand and/or a foot suspension, by means of which the torque arising during the operation of the electric machine can be discharged to a foundation, or to a support face of the electric machine. The respective support device is preferably disposed at the axial height of at least one of the receptacle elements. That is to say that, with a cross section through the electric machine perpendicular to the longitudinal axis, both one of the receptacle elements and the respective foot stand or the respective foot suspension are sectioned. This configuration can prove advantageous when particularly large torques are to be transmitted. In some configurations, advantageous vibration properties and thus a reduction in noise during operation can be achieved if the respective support device is disposed so as to be offset in the axial direction with respect to the receptacle elements, for example approximately in the center between two adjacent receptacle elements.

The proposed wind turbine has in particular a tower and a nacelle in which the electric machine is housed. Furthermore, the wind turbine has, in particular, three propeller blades which are connected in a torque-proof manner to the rotor of the electric machine. The electric machine is preferably designed as an electric generator.

BRIEF DESCRIPTION OF THE DRAWING

The invention will be described and explained in more detail below with reference to the exemplary embodiments illustrated in the figures. It is shown in.

DETAILED DESCRIPTION OF PREFERRED EMBODIMENTS

Figure 1:
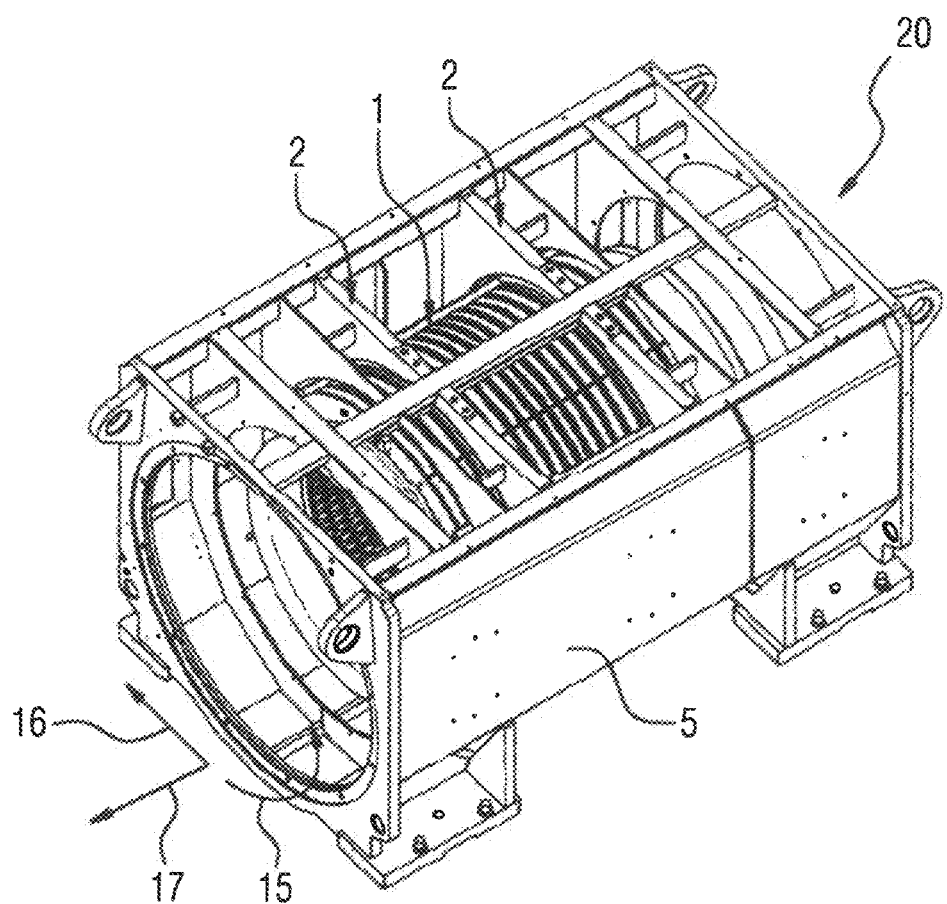
FIGS. 1-3 an exemplary electric machine according to the prior art.
Figure 2:
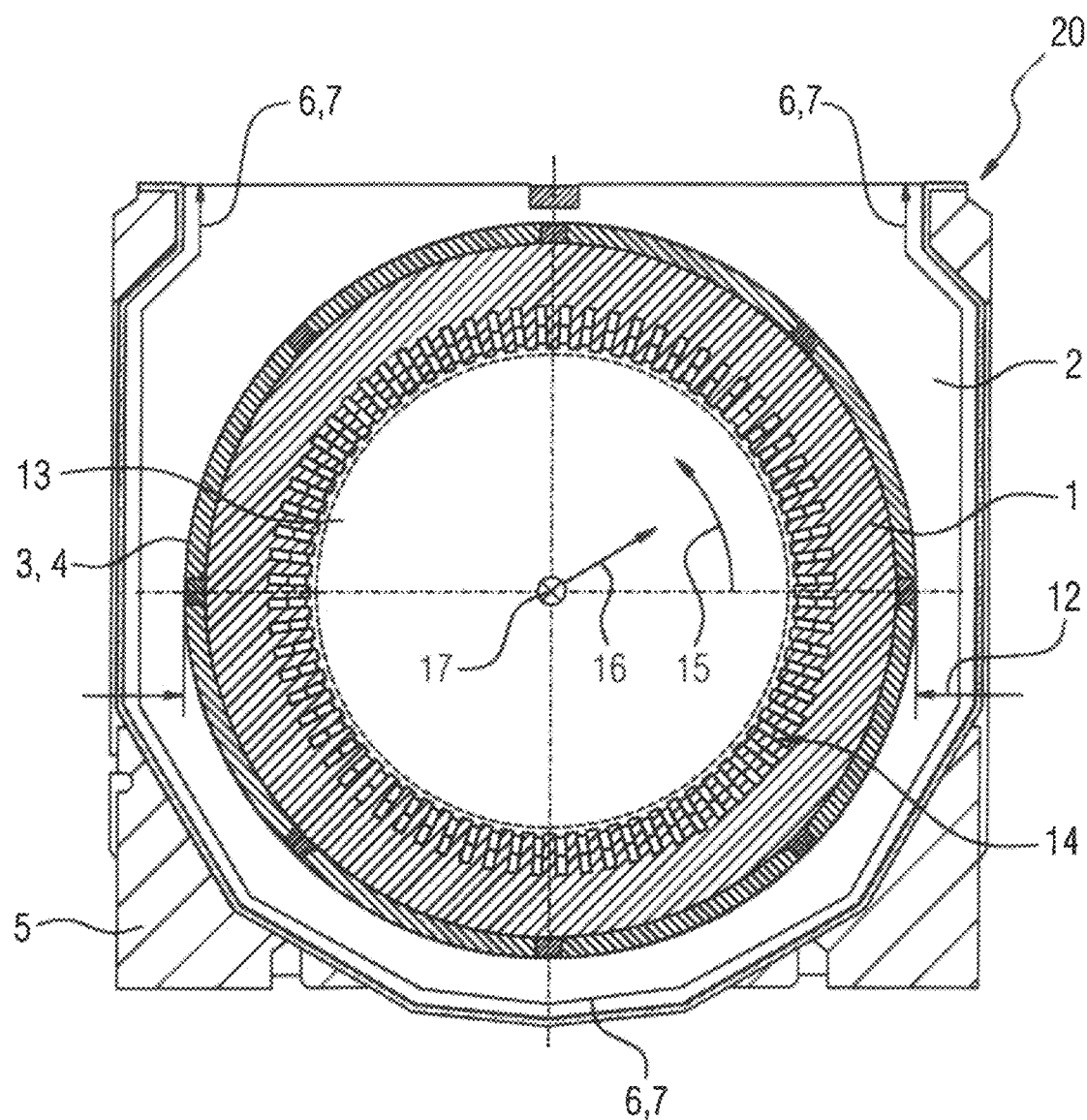
Figure 3:
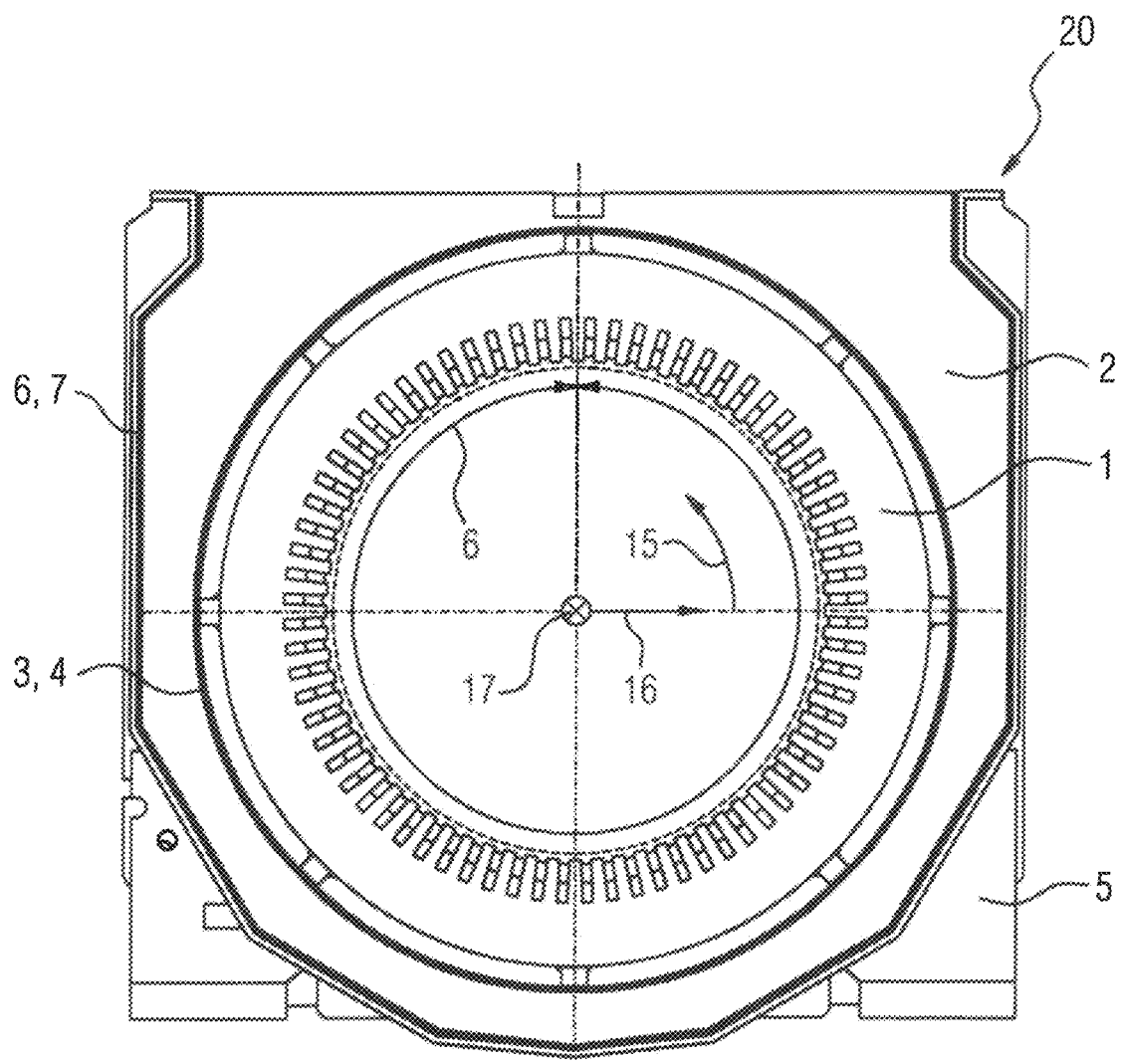
Figure 4:
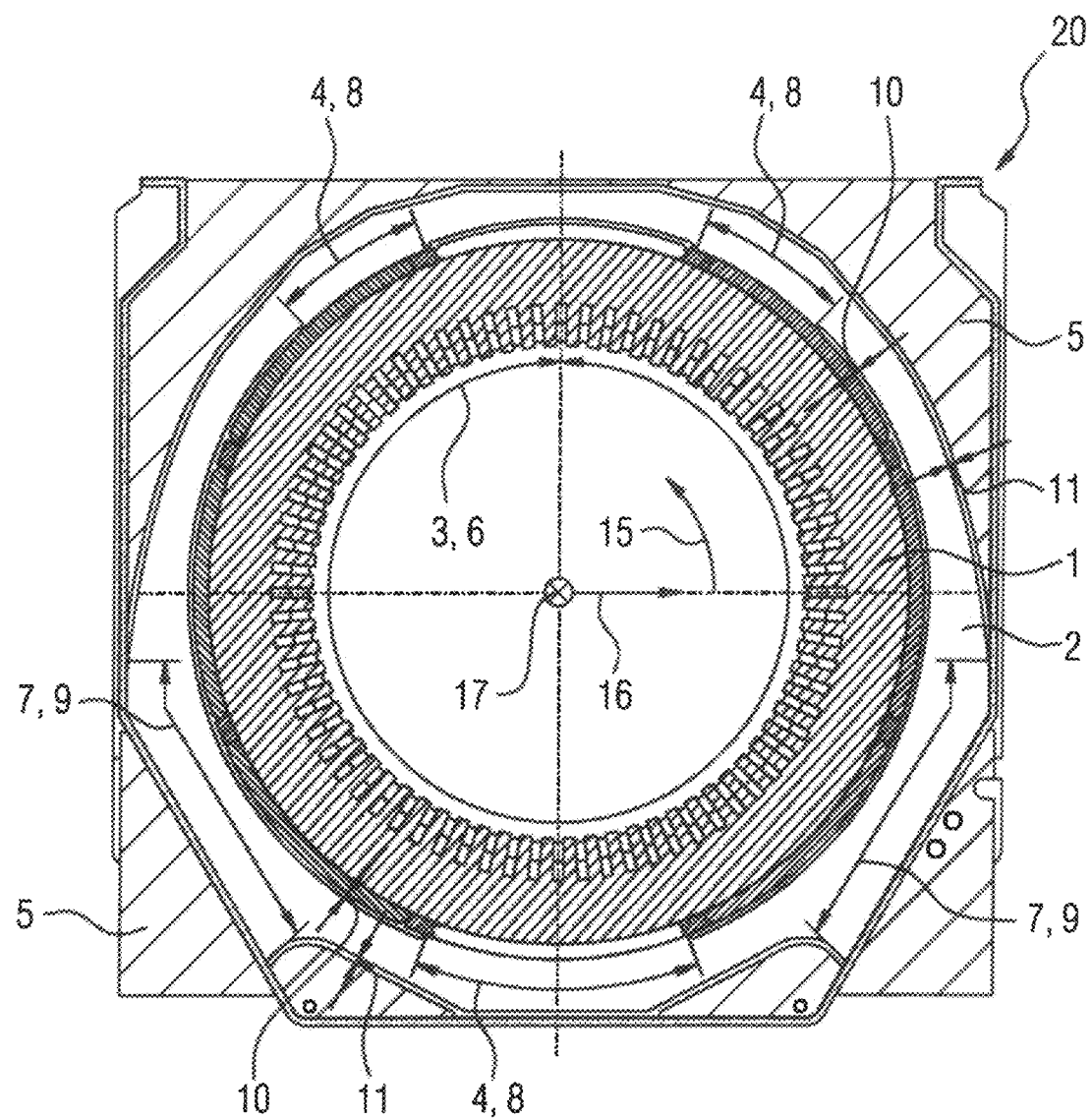
FIGS. 4-8 a first exemplary embodiment of the proposed electric machine.

FIGS. 1 to 3 show an exemplary electric machine 20 according to the prior art. FIG. 1 shows a perspective view of the electric machine 20 from laterally above, and FIGS. 2 and 3 show a cross section through the electric machine 20 perpendicular to the longitudinal axis and to the axial direction 17 at the level of one of the two receptacle elements 2.

The electric machine 20 has a hollow-cylindrical stator 1, in which a rotor 13 is usually rotatably mounted, as indicated by the dashed line in FIG. 2. The rotor 13 is disposed in the radial direction 16 within the stator 1, which has an outer diameter 12. Furthermore, the electric machine 20 has two receptacle elements 2, which completely enclose the stator 1 in each case in the circumferential direction 15 and are continuous in the circumferential direction 15, i.e. over the full circumference to which the stator 1 is connected. The two receptacle elements 2 are disposed so as to be mutually offset in the axial direction 17. Said connection is usually achieved by welding the stator 1 to the respective receptacle element 2. The respective inner cover length 3, along which the respective receptacle element 2 encloses the stator 1 in the circumferential direction 15, thus corresponds to the full circumference of 360°. The same applies to the respective inner fastening length 4 along which the respective receptacle element 2 is connected to the stator 1.

The electric machine 20 also has a stator housing 5 which often completely or at least predominantly encloses the respective receptacle element 2 and thus the stator 1 in the circumferential direction 16. In the electric machine 20 shown in FIGS. 1 to 3, the stator housing 5 encloses the respective receptacle element 2 along a respective outer cover length 6 which corresponds to approximately three quarters of the full circumference, i.e. approx. 270°. The stator housing 5 is connected to the respective receptacle element 2 along a respective outer fastening length 7, which corresponds to the outer cover length 6 and thus also about three quarters of the full circumference, i.e. approx. 270°.

The stator 1 has slots introduced in the radial direction 16, into which the stator windings are usually introduced.

Figure 5:
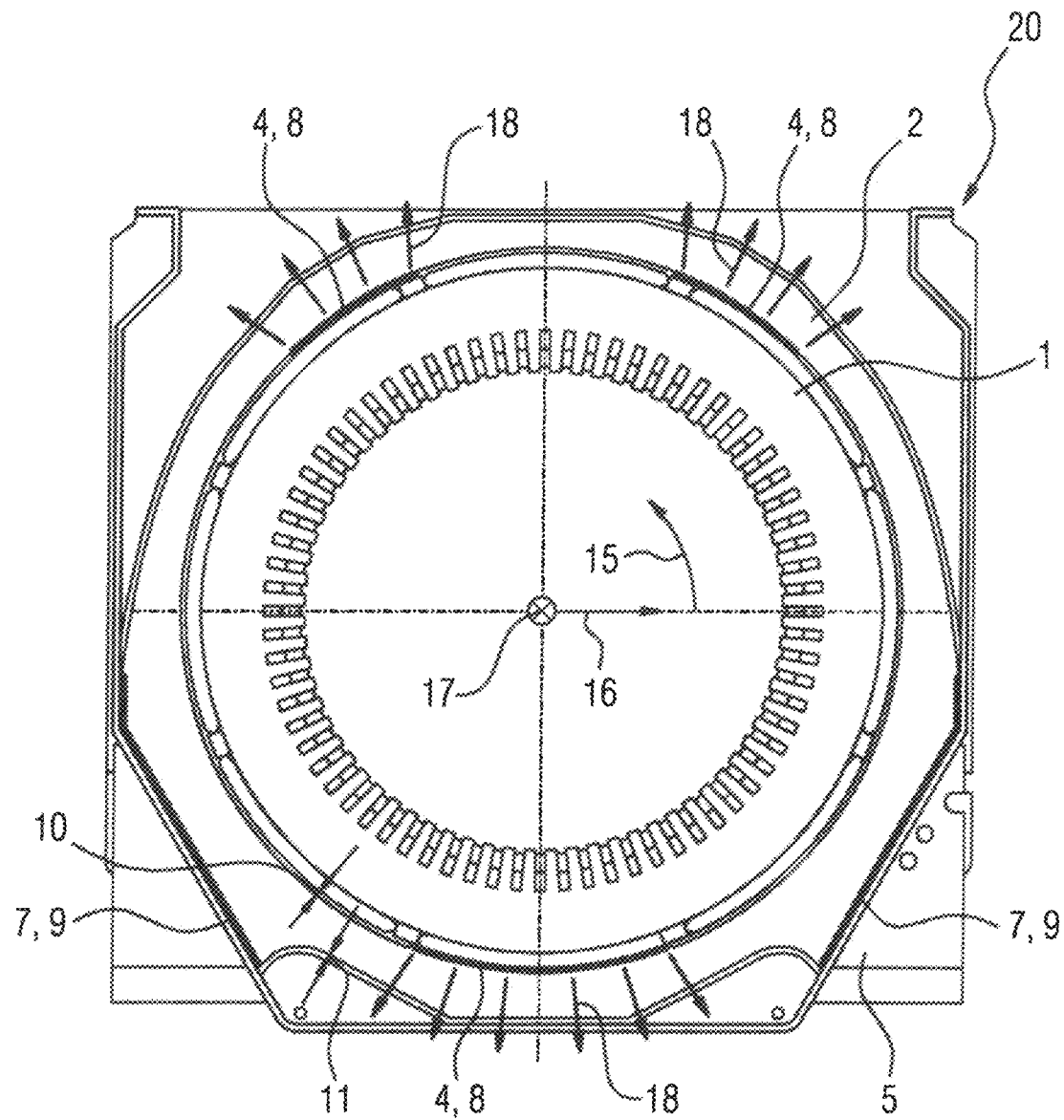
Figure 6:
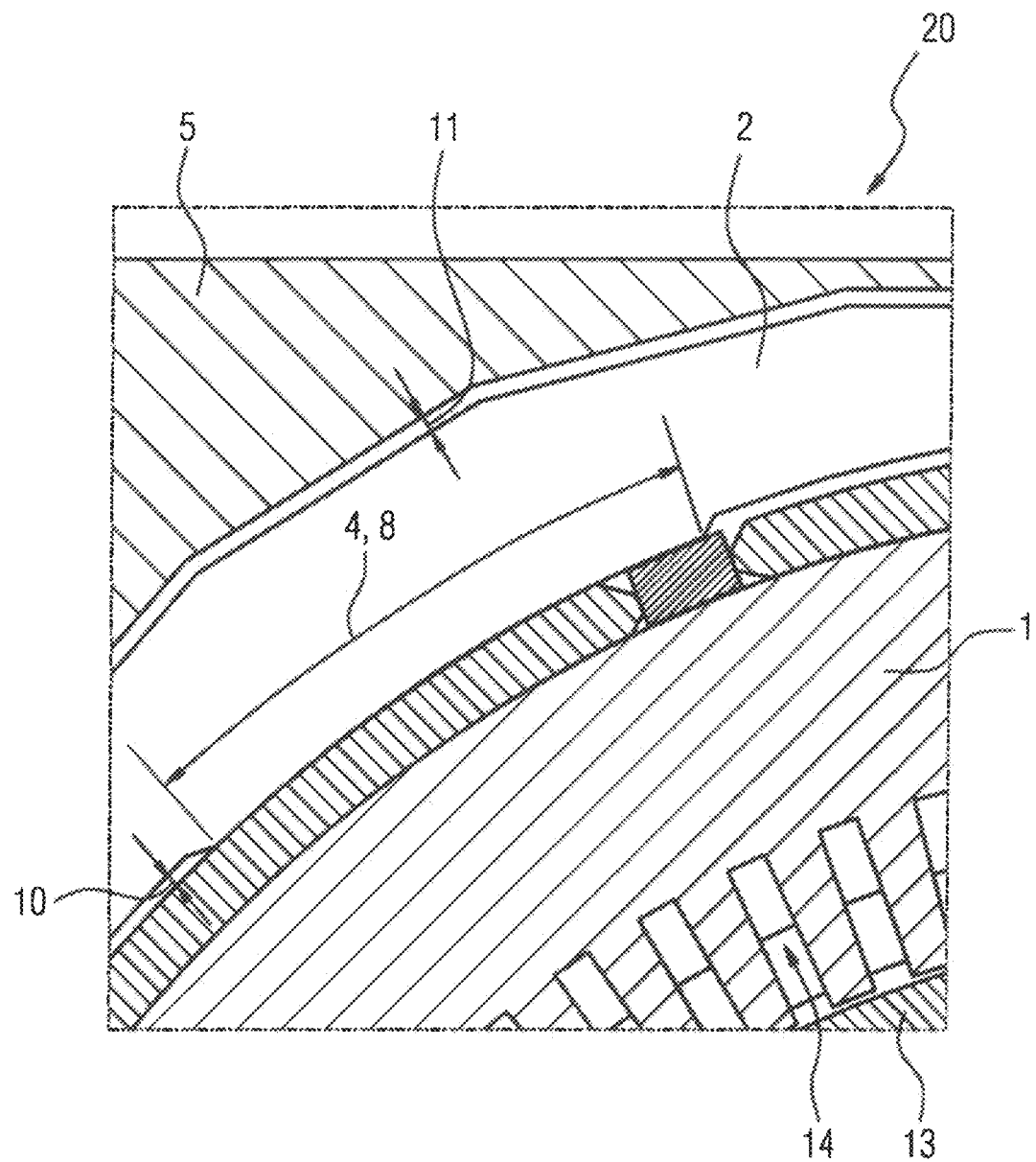
Figure 7:
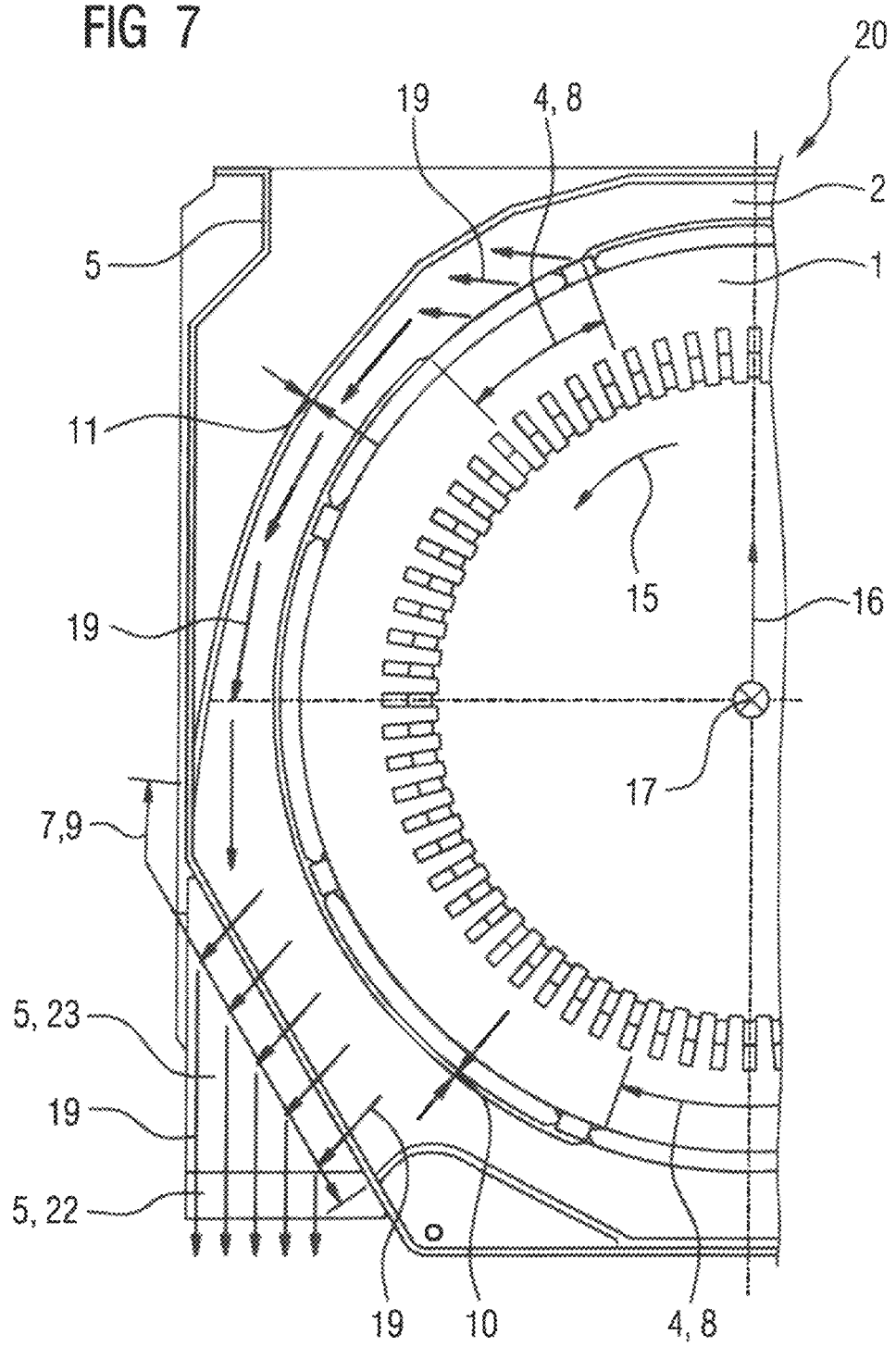
Figure 8:
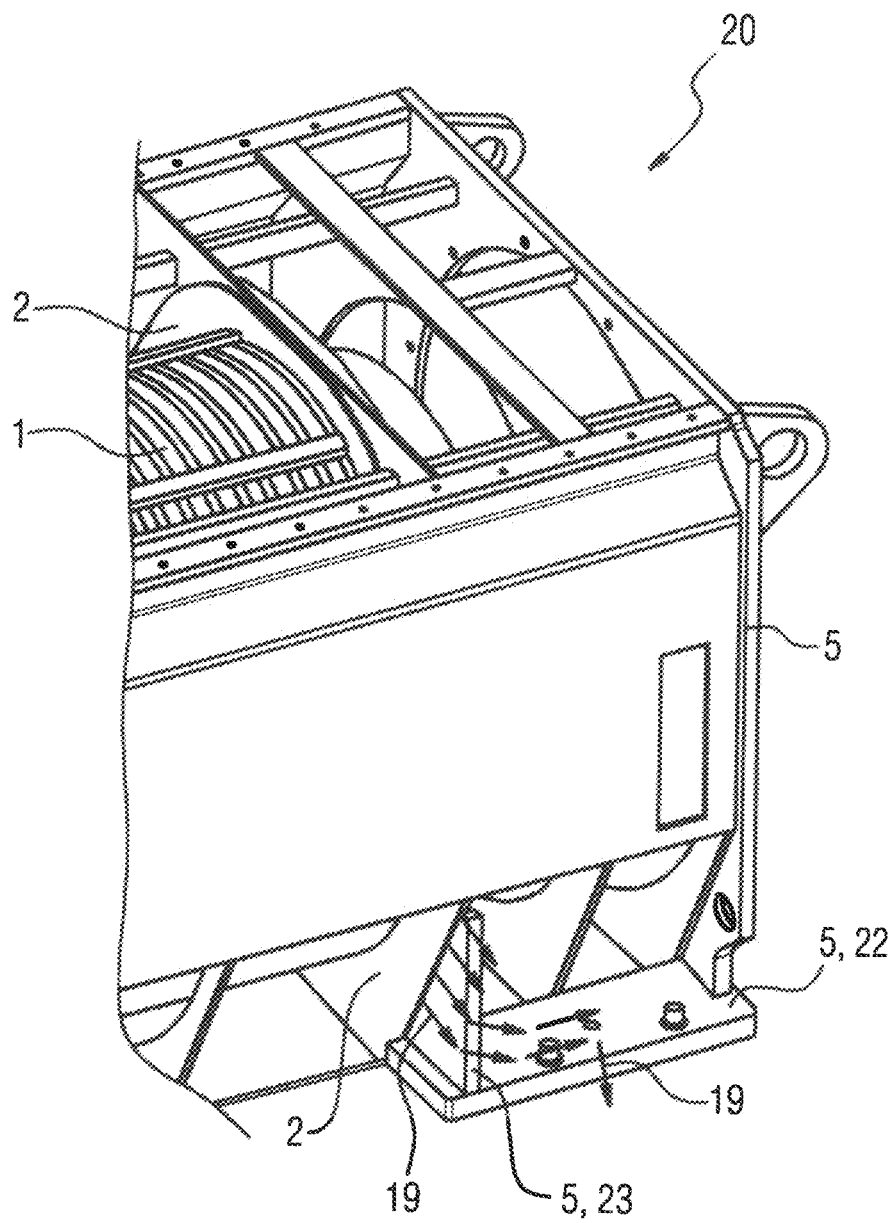

FIGS. 4 to 8 show a first exemplary embodiment of the proposed electric machine 20, the same reference symbols as in FIG. 1 designating the same objects. FIGS. 4 to 7 show a cross section through the electric machine 20 perpendicular to the longitudinal axis and to the axial direction 17 at the level of one of the two receptacle elements 2. FIGS. 6 and 7 show two different sections of this view and FIG. 8 shows a perspective view of the electric machine 20.

In the case of the electric machine 20, the housing 5 completely encloses the receptacle element 2 in the circumferential direction, so that the outer covering length 6 extends across the full circumference of 360°. The electric machine 2 can have two or more such receptacle elements 2. Furthermore, the receptacle element 2 shown also completely encloses the stator 1 in the circumferential direction, so that the inner cover length 3 also extends across the full circumference of 360°.

The electric machine 20 is distinguished, inter alia, by the fact that the inner fastening length 4 along which the respective receptacle element 2 is connected to the stator 1 extends at most along half of the respective inner cover length 3. In this case, the inner fastening length 4 in the illustrated electric machine 20 extends across approximately 80°, i.e. a little less than a quarter of the full circumference. The inner fastening length 4 is divided into three inner fastening portions 8, one of which is disposed centrally at the bottom and extends across approx. 40° and the other two of which are disposed so as to be slightly offset relative to the center at the top and extend in each case across approx. 20°. The inner fastening length 4 is thus divided in the circumferential direction 15 into the three inner fastening portions 8 which are disposed at a mutual spacing in the circumferential direction 15.

In particular, a respective inner air gap 10 is thus disposed between the respective receptacle element 2 and the stator 1 so as to be outside the respective inner fastening length 4 in the radial direction 16.

Furthermore, the illustrated electric machine 20 is distinguished, inter alia, by the fact that the outer fastening length 7, along which the stator housing 5 is connected to the respective receptacle element 2, extends at most along two thirds of the respective outer cover length 6. In this case, the outer fastening length 7 in the illustrated electric machine 20 extends across approximately 90°, i.e. approximately a quarter of the full extent. The outer fastening length 7 is divided into two outer fastening portions 9, both of which are disposed on the bottom right and bottom left and each extend across approximately 45°. The outer fastening length 7 is thus divided in the circumferential direction 15 into the two outer fastening portions 9 which are disposed at a mutual spacing in the circumferential direction 15.

In particular, an outer air gap 11 is thus disposed between the stator housing 5 and the respective receptacle element 2 so as to be outside the respective outer fastening length 7 in the radial direction 16.

Thus, the electric machine 20 has more respective inner fastening portions 8 than respective outer fastening portions 9.

Furthermore, in the electric machine 20 the respective inner fastening portions 8 are disposed so as to be offset in the circumferential direction 15 relative to the respective outer fastening portions 9. This means that the respective inner fastening portions 8 in the circumferential direction 15 do not overlap with one of the outer fastening portions 9.

As indicated by the arrows 18 in FIG. 5, the respective receptacle element 2 can vibrate outwards in the radial direction 16 in the region of the respective inner fastening portion 8, wherein these vibrations are not passed on directly to the stator housing 5, since the respective inner fastening portions 8 in the circumferential direction 15 do not overlap with one of the outer fastening portions 9.

The respective receptacle element 2 is designed as a receptacle ring which completely encloses the stator 1 in the circumferential direction 15.

The respective receptacle element 2 is preferably welded to the stator 1 in the region of the respective inner fastening length 4. In particular, the stator housing 5 is welded to the respective receptacle element 2 in the region of the respective outer fastening length 7.

In particular, the electric machine 20 has an electrical output of at least 1.5 MW, wherein the stator 1 preferably has an outer diameter of at least 900 mm.

As indicated by the arrows 19 in FIGS. 7 and 8, during operation of the electric machine 20, torque can be transmitted from the stator 1 to the respective receptacle element 2 and finally to the housing 5, wherein the housing 5 (bottom left in FIG. 7) has a foot stand 23 and a foot suspension 22, which absorb the torque and finally discharge the latter to the underlying foundation of the electric machine 20. The foot stand 23 and the foot suspension 22 are regarded as part of the stator housing 5. In particular, the foot stand 23 and the foot suspension 22 are the support device explained above. As can be seen in FIGS. 7 and 8, this support device is disposed at the axial height of the receptacle element 2 shown. Alternatively, it is also conceivable that the support device is disposed so as to be offset in the axial direction 17 in relation to the receptacle element 2, e.g. approximately in the center between two adjacent receptacle elements 2.

Figure 9:
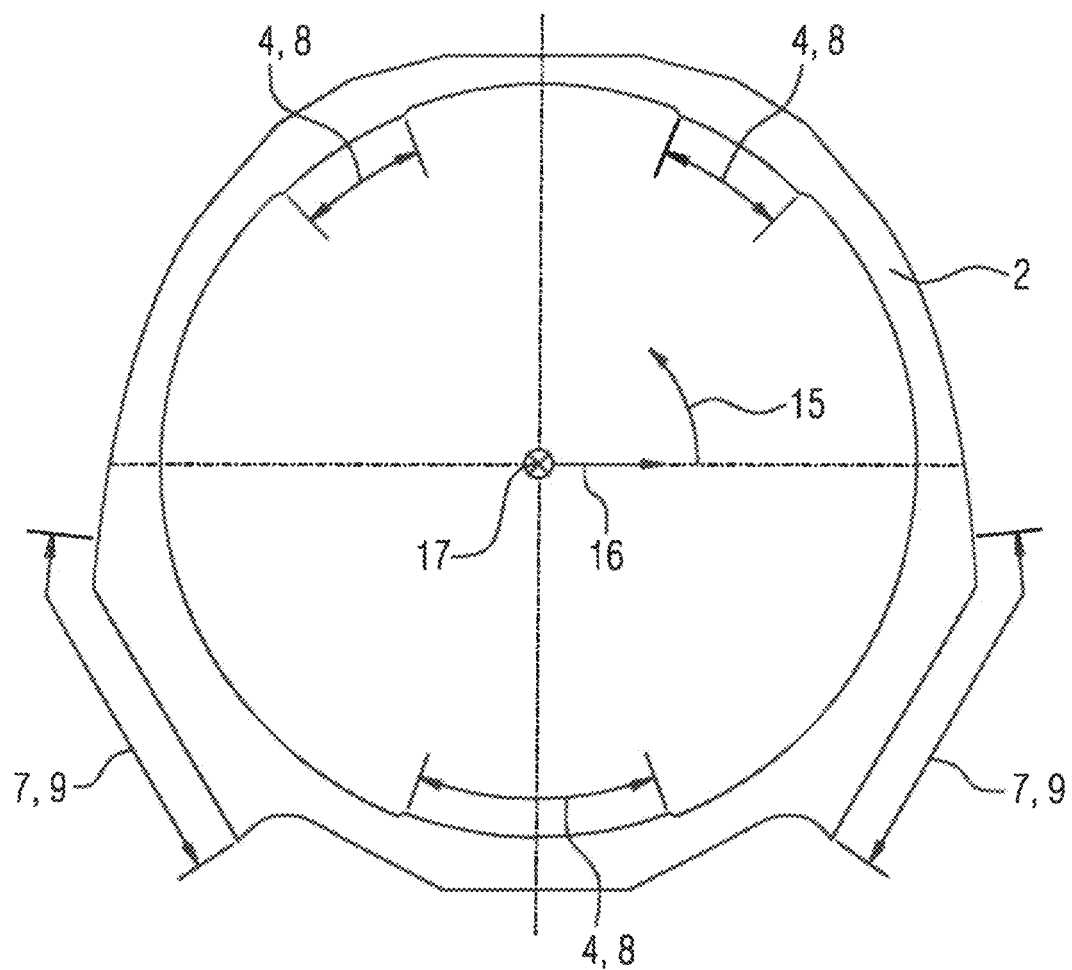
FIG. 9 a receptacle element of the first exemplary embodiment of the proposed electric machine.

FIG. 9 shows a receptacle element 2 of the first exemplary embodiment of the proposed electric machine 20.

It is easy to see that the receptacle element 2 extends further radially inward in the region of the inner fastening length 4, or the three inner fastening portions 8, than in the regions between the inner fastening portions 8. As a result, the receptacle element 2 on the inner fastening portions 8 rests from radially outside on the appropriately dimensioned, hollow-cylindrical stator 1 and can be easily connected to the latter, for example welded. In the regions between the inner fastening portions 8, an inner air gap 10 is thus formed, which has already been explained above. The outer fastening length 7 and the two outer fastening portions 9 are also shown. An outer air gap 11 forms between the receptacle element 2 and the stator housing 5 in the circumferential direction between the two outer fastening portions 9.

Figure 10:
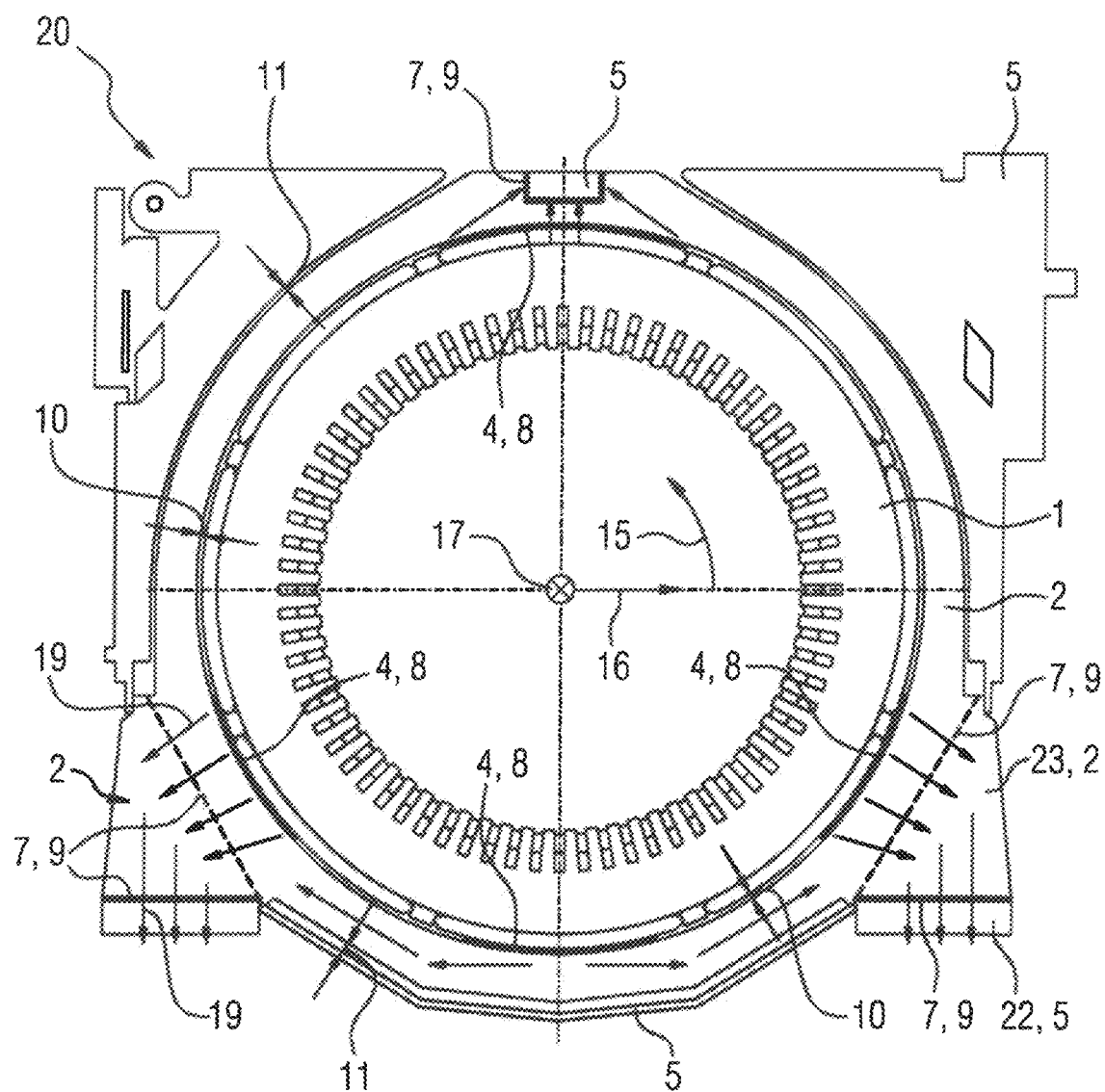
FIG. 10 a second exemplary embodiment of the proposed electric machine.

FIG. 10 shows a second exemplary embodiment of the proposed electric machine 20. The electric machine 20 in turn has a foot stand 23 and a foot suspension 22, the foot stand 23 being formed in one piece with the rest of the respective receptacle element 2 and the foot suspension 22 being considered part of the stator housing 5.

The electric machine 20 shown is distinguished, inter alia, by the fact that the inner fastening length 4 extends along approximately 110° of the respective inner cover length 3, wherein the respective inner cover length 3 extends about the full circumference, i.e. 360°. The inner fastening length 4 is divided into four inner fastening portions 8, two of which are disposed centrally at the top or bottom and each extend across approx. 30° to 40° and of which the other two are disposed so as to be slightly offset relative to the center and extend in each case across approx. 20° to 30°. The inner fastening length 4 is thus divided in the circumferential direction 15 into the four inner fastening portions 8 which are disposed at a mutual spacing in the circumferential direction 15.

In particular, a respective inner air gap 10 is thus disposed between the respective receptacle element 2 and the stator 1 so as to be outside the respective inner fastening length 4 in the radial direction 16.

Furthermore, the illustrated electric machine 20 is distinguished, inter alia, by the fact that the outer fastening length 6 extends along approximately 80° and the respective outer cover length 7 extends along approximately 340°, i.e. almost completely about the respective receptacle element 2. In this case, some housing parts, especially in the two regions at the bottom right and left, are not shown in FIG. 10. The outer fastening length 7 is divided into three outer fastening portions 9, one of which is disposed in the center at the top and extends across approx. 10° and the other two of which are disposed on the bottom right and bottom left and each extend across approx. 30° up to 40°. The outer fastening length 7 is thus divided in the circumferential direction 15 into the three outer fastening portions 9 which are mutually spaced apart in the circumferential direction 15.

In particular, an outer air gap 11 is thus disposed between the stator housing 5 and the respective receptacle element 2 so as to be outside the respective outer fastening length 7 in the radial direction 16.

Thus, the electric machine 20 has more respective inner fastening portions 8 than respective outer fastening portions 9.

Furthermore, in the electric machine 20 the respective inner fastening portion 8 is disposed so as to be offset at the bottom in the center in the circumferential direction 15 in relation to the respective outer fastening portions and 9. This means that this respective inner fastening portion 8 does not overlap with one of the outer fastening portions 9 in the circumferential direction 15. The respective inner fastening portion 8 at the top center partially overlaps the respective outer fastening portion 9 which is also located at the top center. The other respective inner fastening portions 8 at the bottom right and left also partially overlap with the respective outer fastening portions 9, which are also disposed at the bottom right and bottom left.

In particular, the foot stand 23 and the foot suspension 22 are the support device explained above. As can be seen in FIG. 10, this support device is disposed at the axial height of the receptacle element 2 shown. Alternatively, it is also conceivable that the support device is disposed so as to be offset in the axial direction 17 from the receptacle element 2, e.g. approximately in the center between two adjacent receptacle elements 2.

Figure 11:
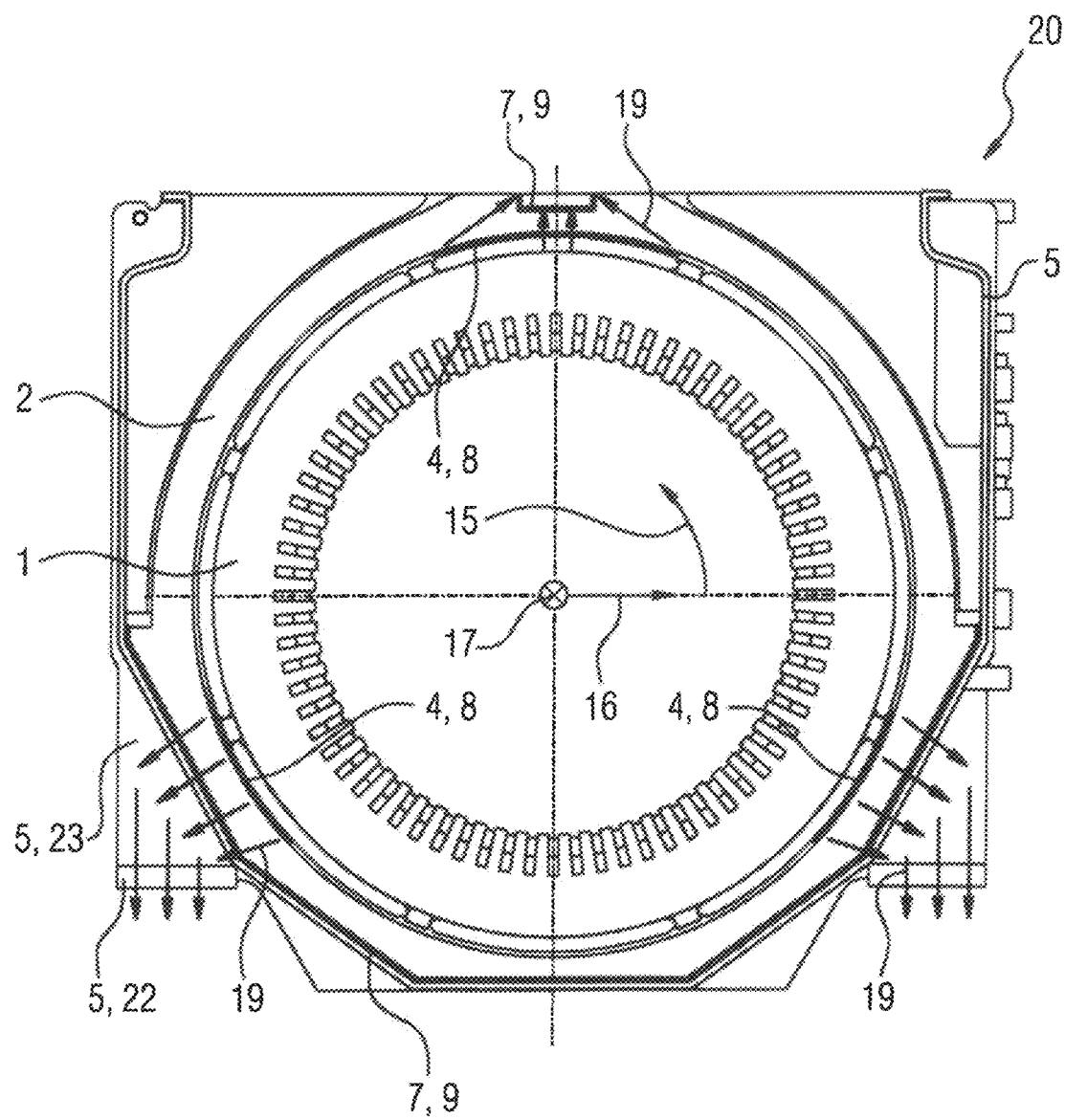
FIG. 11 a third exemplary embodiment of the proposed electric machine.

FIG. 11 shows a third exemplary embodiment of the proposed electric machine.

The electric machine 20 shown is distinguished, inter alia, by the fact that the inner fastening length 4 extends along approximately 90° of the respective inner cover length 3, wherein the respective inner cover length 3 extends about the full circumference, i.e. 360°. The inner fastening length 4 is divided into three inner fastening portions 8, one of which is disposed centrally at the top and extends across approx. 30° to 40° and the other two of which are disposed at the bottom right and left and each extend across approx. 20° to 30°. The inner fastening length 4 is thus divided in the circumferential direction 15 into the three inner fastening portions 8 which are disposed at a mutual spacing in the circumferential direction 15.

Furthermore, the illustrated electric machine 20 is distinguished, inter alia, by the fact that the outer fastening length 6 extends along approximately 190°, and the respective outer cover length 7 extends about the full circumference, i.e. 360°. The outer fastening length 7 is divided into two outer fastening portions 9, one of which is disposed centrally at the top and extends across approximately 10° and the other of which is disposed centrally at the bottom and extends across approximately 180°. The outer fastening length 7 is thus divided in the circumferential direction 15 into the two outer fastening portions 9 which are disposed at a mutual spacing in the circumferential direction 15. Alternatively, it is conceivable that the outer fastening length 6 only extends along approximately 180° and only has the outer fastening length 7 disposed at the bottom, which extends across approximately 180°.

Thus, the electric machine 20 (in both alternatives) has more respective inner fastening portions 8 than respective outer fastening portions 9.

The two respective inner fastening portions 8 at the bottom right and left in the circumferential direction 15 completely overlap with the respective outer fastening portion 9 disposed centrally at the bottom. Furthermore, the respective inner fastening portion 8 partially overlaps at the top in the circumferential direction 15 with the respective outer fastening portion 9 disposed centrally at the top, provided that this outer fastening portion 9 is provided.

In particular, the foot stand 23 and the foot suspension 22 are the support device explained above. As can be seen in FIG. 11, this support device is disposed at the axial height of the receptacle element 2 shown. Alternatively, it is also conceivable that the support device is disposed so as to be offset in the axial direction 17 from the receptacle element 2, e.g. approximately in the center between two adjacent receptacle elements 2.

Figure 12:
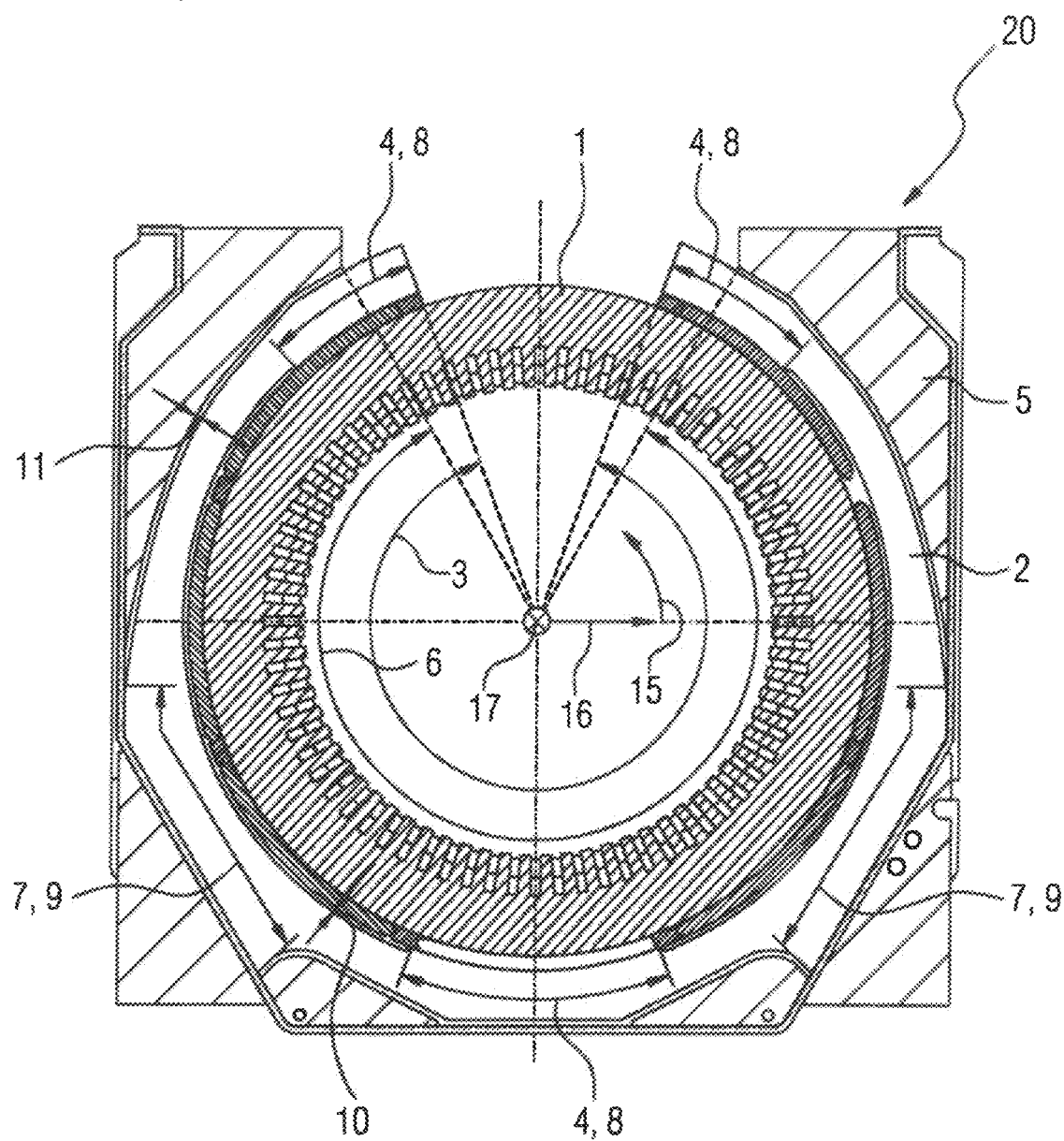
FIG. 12 a fourth exemplary embodiment of the proposed electric machine.

FIG. 12 shows a fourth exemplary embodiment of the proposed electric machine 20. The electric machine 20 shown has some similarities to the first exemplary embodiment. However, the stator housing 5 no longer extends completely about the stator 1 in the circumferential direction 15, but only along approximately 300°. The respective receptacle element 2 also no longer extends completely about the stator 1 in the circumferential direction, but only along approximately 320°.

Figure 13:
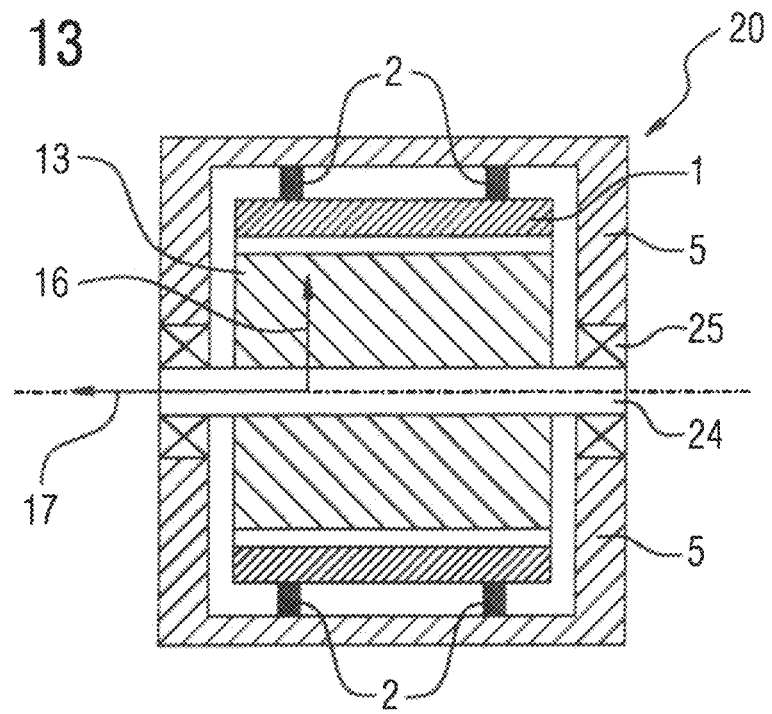
FIG. 13 a fifth exemplary embodiment of the proposed electric machine.

FIG. 13 shows a fifth exemplary embodiment of the proposed electric machine 20. A longitudinal section along the axial direction 17 of the electric machine 20 is shown. The electric machine 20 has a rotor 13 which is connected to a shaft 24 in a rotationally fixed manner. The shaft 24 is rotatably mounted via bearings 25 in a stator housing 5, in which two receptacle elements 2 and the hollow-cylindrical stator 1 are disposed. The stator 1, the receptacle elements 2 and the stator housing 5 can be designed as explained above.

The electric machine 20 is preferably an electric generator that is used in a wind turbine.

Figure 14:
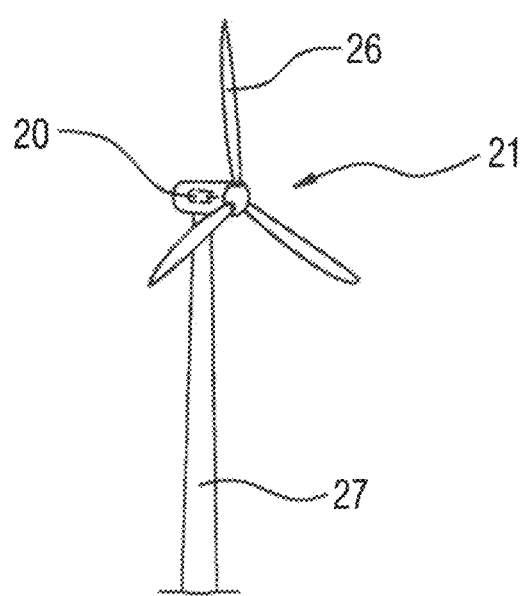
FIG. 14 an exemplary embodiment of the proposed wind turbine.

FIG. 14 shows an embodiment of the proposed wind turbine 21. The wind turbine 21 has a tower 27 on which a nacelle with an electric machine 20 is rotatably mounted. The electric machine 20 or its rotor 13 is connected in a rotationally fixed manner to a propeller having three propeller blades 26.

The invention claimed is:

1. An electric machine, comprising:
a hollow-cylindrical stator;
at least two receptacle elements connected in a rotationally fixed manner to the stator in a circumferential direction along an inner fastening length, each of the at least two receptacle elements designed to at least partially enclose the stator in a circumferential direction along an Inner cover length; and
a stator housing connected in a rotationally fixed manner to the at least two receptacle elements in the circumferential direction along an outer fastening length and designed to at least partially enclose the at least two receptacle elements in the circumferential direction along an outer cover length,
wherein the inner fastening length extends at most along half of the inner cover length and/or the outer fastening length extends at most along two thirds of the outer cover length,
wherein the inner fastening length extends along at most 120° in the circumferential direction, and the outer fastening length extends along at most 200° in the circumferential direction, and/or
wherein the inner fastening length in the circumferential direction is divided into a plurality of inner fastening portions in spaced-apart relationship, and the outer fastening length in the circumferential direction is divided into a plurality of outer fastening portions in spaced-apart relationship.

2. The electric machine of claim 1, constructed for use as an electric generator for a wind turbine.

3. The electric machine of claim 1, wherein the inner fastening length extends along 50° to 80° in the circumferential direction.

4. The electric machine of claim 1, wherein the outer fastening length extends along 60° to 200° or 80° to 120° in the circumferential direction.

5. The electric machine of claim 1, wherein the plurality of inner fastening portions includes at least three or at most six inner fastening portions in spaced-apart relationship.

6. The electric machine of claim 1, wherein the plurality of outer fastening portions includes at least two or at most six outer fastening portions in spaced-apart relationship.

7. The electric machine of claim 1, wherein the at least two receptacle elements are each designed as a receptacle ring which completely encloses the stator in the circumferential direction.

8. The electric machine of claim 1, wherein the at least two receptacle elements are each mechanically releasably connected and/or connected in a form-fitting manner to the stator in the circumferential direction along the Inner fastening length.

9. The electric machine of claim 1, wherein the stator housing is mechanically releasably connected or connected in a materially integral manner to the at least two receptacle elements in the circumferential direction along the outer fastening length.

10. The electric machine of claim 9, wherein the stator housing is welded, to the at least two receptacle elements.

11. The electric machine of claim 1, wherein the plurality of inner fastening portions corresponds to the plurality of outer fastening portions.

12. The electric machine of claim 1, wherein the plurality of inner fastening portions exceeds the plurality of outer fastening portions.

13. The electric machine of claim 1, wherein at least one of the inner fastening portions is disposed so as to be offset in the circumferential direction relative to a respective one of the outer fastening portions.

14. The electric machine of claim 1, wherein two or more or all of the inner fastening portions are disposed so as to be offset in the circumferential direction relative to the outer fastening portions.

15. The electric machine of claim 1, wherein at least one of the Inner fastening portions overlaps in the circumferential direction with at least one of the outer fastening portions.

16. The electric machine of claim 1, wherein two or more or all of the inner fastening portions overlap in the circumferential direction with at least one of the outer fastening portions, respectively.

17. The electric machine of claim 1, wherein an Inner air gap is disposed between the at least two receptacle elements and the stator outside the inner fastening length in a radial direction.

18. The electric machine of claim 1, wherein an outer air gap is disposed between the stator housing and the at least two receptacle elements outside the outer fastening length in a radial direction.

19. The electric machine of claim 1, wherein the stator has an outer diameter of at least 900 mm, and the electric machine has an electrical output of at least 1.5 MW.

20. A wind turbine, comprising an electric machine, said electric machine comprising a hollow-cylindrical stator, at least two receptacle elements connected in a rotationally fixed manner to the stator in a circumferential direction along an inner fastening length, each of the at least two receptacle elements designed to at least partially enclose the stator in a circumferential direction along an inner cover length, and a stator housing connected in a rotationally fixed manner to the at least two receptacle elements in the circumferential direction along an outer fastening length and designed to at least partially enclose the at least two receptacle elements in the circumferential direction along an outer cover length, wherein the inner fastening length extends at most along half of the inner cover length and/or the outer fastening length extends at most along two thirds of the outer cover length, wherein the inner fastening length extends along at most 120° in the circumferential direction, and the outer fastening length extends along at most 200° in the circumferential direction, and/or wherein the inner fastening length in the circumferential direction is divided into a plurality of inner fastening portions in spaced-apart relationship, and the outer fastening length in the circumferential direction is divided into a plurality of outer fastening portions in spaced-apart relationship.

\* \* \* \* \*